(12) United States Patent
Jamadagni et al.

(10) Patent No.: US 10,721,597 B2
(45) Date of Patent: Jul. 21, 2020

(54) SYSTEM AND METHOD OF PROVIDING MULTIMEDIA SERVICE TO A USER EQUIPMENT

(71) Applicant: Reliance Jio Infocomm Limited, Mumbai (IN)

(72) Inventors: Satish Nanjunda Swamy Jamadagni, Bengaluru (IN); Sarvesha Anegundi Ganapathi, Bengaluru (IN); Pradeep Krishnamurthy Hirisave, Bengaluru (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 35 days.

(21) Appl. No.: 15/540,209

(22) PCT Filed: Dec. 19, 2015

(86) PCT No.: PCT/IB2015/059804
§ 371 (c)(1),
(2) Date: Jun. 27, 2017

(87) PCT Pub. No.: WO2016/108137
PCT Pub. Date: Jul. 7, 2016

(65) Prior Publication Data
US 2018/0007519 A1    Jan. 4, 2018

(30) Foreign Application Priority Data
Dec. 31, 2014    (IN) .......................... 4260/MUM/2014

(51) Int. Cl.
*H04W 4/06* (2009.01)
*H04L 29/06* (2006.01)
(Continued)

(52) U.S. Cl.
CPC ............. *H04W 4/06* (2013.01); *H04L 12/189* (2013.01); *H04L 65/1069* (2013.01);
(Continued)

(58) Field of Classification Search
None
See application file for complete search history.

(56) References Cited

U.S. PATENT DOCUMENTS 7,991,396 B2 *  8/2011  Wang .................. H04L 12/1877
                                                    370/392
8,918,085 B2 * 12/2014  Lew .................. H04L 29/12896
                                                    455/414.1
(Continued)

FOREIGN PATENT DOCUMENTS

GB          2509845 A       7/2014

OTHER PUBLICATIONS

International Search Report for PCT/IB2015/059804 dated Mar. 11, 2016.
(Continued)

*Primary Examiner* — Gregory B Sefcheck
*Assistant Examiner* — Suk Jin Kang
(74) *Attorney, Agent, or Firm* — Ladas & Parry, LLP

(57) ABSTRACT

A system and method to provide multimedia services to consumption end devices like set-top boxes and legacy phone and tablet devices that are incompatible to receive the multimedia service directly. These consumption devices interact with devices that provide multimedia service. Further, the present disclosure discloses mechanisms where an end consumption device can connect to a device like LTE connectivity device and obtain eMBMS multimedia services.

15 Claims, 5 Drawing Sheets

(51) Int. Cl.
*H04N 21/647* (2011.01)
*H04N 21/643* (2011.01)
*H04L 12/18* (2006.01)
*H04L 29/08* (2006.01)
*H04W 88/02* (2009.01)

(52) U.S. Cl.
CPC ...... *H04L 65/4076* (2013.01); *H04L 65/4084* (2013.01); *H04L 67/16* (2013.01); *H04N 21/643* (2013.01); *H04N 21/647* (2013.01); *H04L 65/1006* (2013.01); *H04L 69/16* (2013.01); *H04W 88/02* (2013.01)

(56) References Cited

U.S. PATENT DOCUMENTS

| | | | | |
|---|---|---|---|---|
| 2003/0014488 A1* | 1/2003 | Dalal | H04L 29/06 | 709/204 |
| 2006/0029063 A1* | 2/2006 | Rao | H04L 12/2856 | 370/389 |
| 2006/0029064 A1* | 2/2006 | Rao | H04L 12/2856 | 370/389 |
| 2007/0115932 A1* | 5/2007 | Yang | H04L 47/14 | 370/352 |
| 2007/0211882 A1* | 9/2007 | Hatte | H04Q 3/0012 | 379/291 |
| 2008/0062998 A1* | 3/2008 | Kim | H04N 21/234318 | 370/395.64 |
| 2008/0232362 A1* | 9/2008 | Miyajima | H04L 29/12367 | 370/389 |
| 2009/0323658 A1* | 12/2009 | Balasubramanian | H04L 65/1069 | 370/338 |
| 2012/0099504 A1* | 4/2012 | Hyun | H04L 12/1818 | 370/312 |
| 2013/0014206 A1* | 1/2013 | Rao | H04L 12/2856 | 726/1 |
| 2013/0029699 A1* | 1/2013 | Alston | H04L 12/66 | 455/466 |
| 2013/0036234 A1* | 2/2013 | Pazos | H04L 12/189 | 709/231 |
| 2013/0128892 A1* | 5/2013 | Rao | H04L 12/2856 | 370/392 |
| 2013/0165084 A1* | 6/2013 | Xu | H04L 67/02 | 455/414.1 |
| 2013/0258934 A1* | 10/2013 | Amerga | H04W 72/00 | 370/312 |
| 2014/0229529 A1* | 8/2014 | Barone | H04L 65/4076 | 709/203 |
| 2014/0241229 A1* | 8/2014 | Bertorelle | H04W 4/06 | 370/312 |
| 2014/0254483 A1* | 9/2014 | Zisimopoulos | H04L 47/266 | 370/328 |
| 2015/0029925 A1* | 1/2015 | Mantin | H04W 72/005 | 370/312 |
| 2015/0049762 A1* | 2/2015 | Mantin | H04L 65/4076 | 370/390 |
| 2016/0094444 A1* | 3/2016 | MeLampy | H04L 45/38 | 370/392 |
| 2016/0164780 A1* | 6/2016 | Timmons | H04L 45/70 | 370/238 |
| 2017/0272691 A1* | 9/2017 | Song | H04N 7/08 | |
| 2017/0273134 A1* | 9/2017 | Cao | H04W 76/046 | |
| 2017/0295535 A1* | 10/2017 | Sherman | H04W 76/10 | |
| 2017/0339061 A1* | 11/2017 | MeLampy | H04L 45/38 | |
| 2017/0374109 A1* | 12/2017 | Atarius | H04L 65/1069 | |
| 2018/0007421 A1* | 1/2018 | Yoo | H04N 21/4345 | |

OTHER PUBLICATIONS

Written Opinion of the International Search Authority PCT/IB2015/059804 dated Mar. 11, 2016.

\* cited by examiner

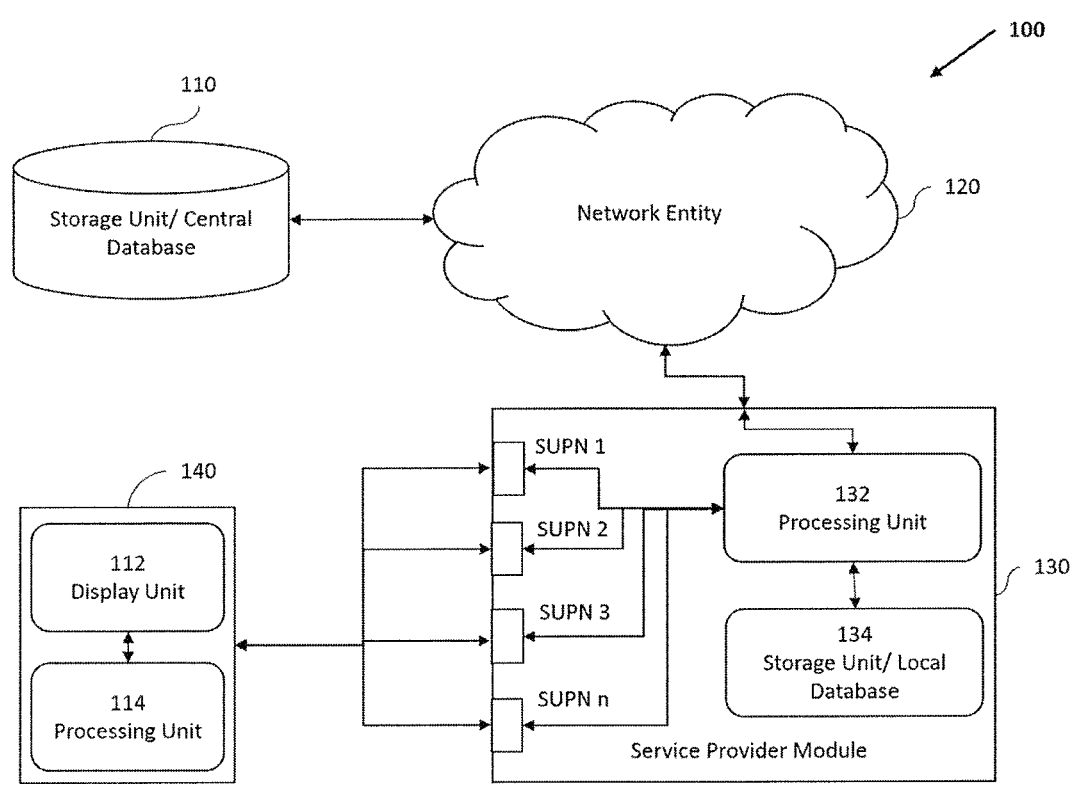
FIGURE: 1a

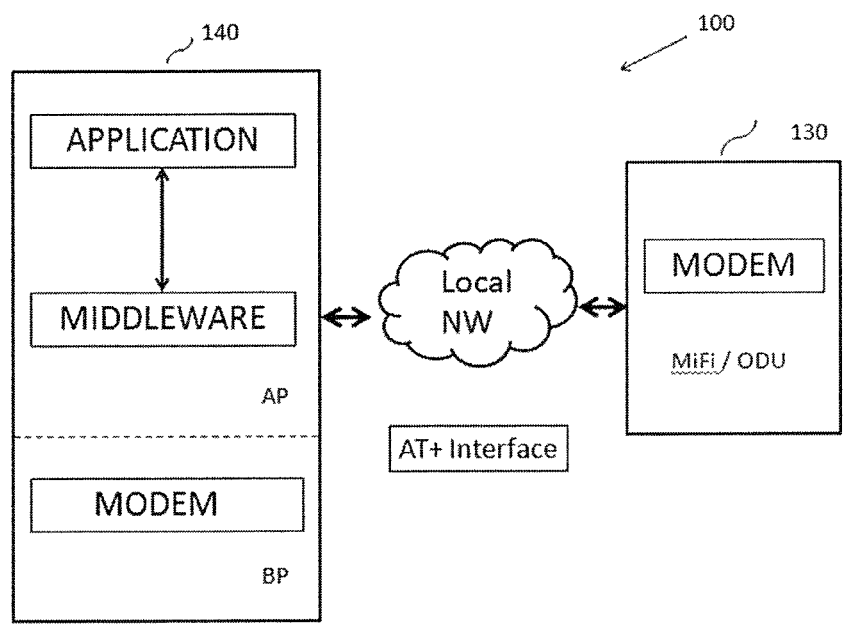
FIGURE: 1b

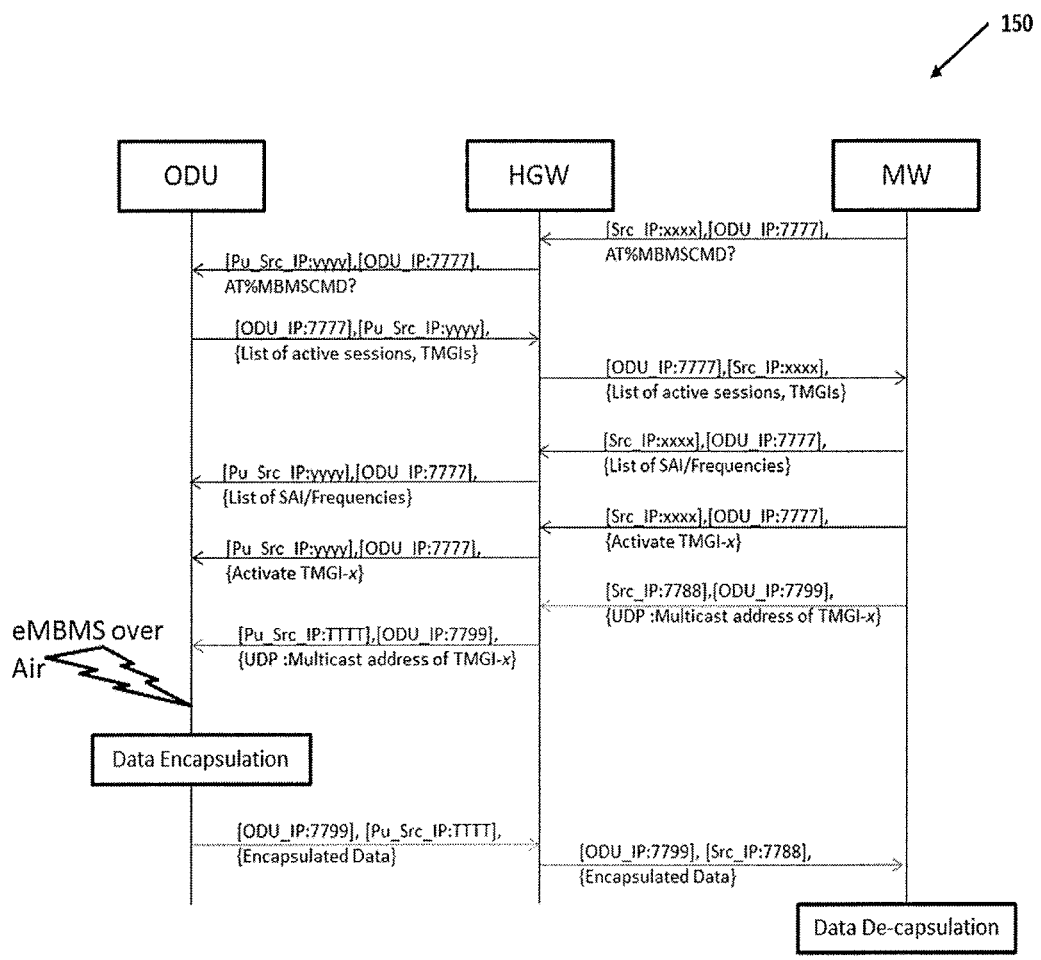
FIGURE: 1c

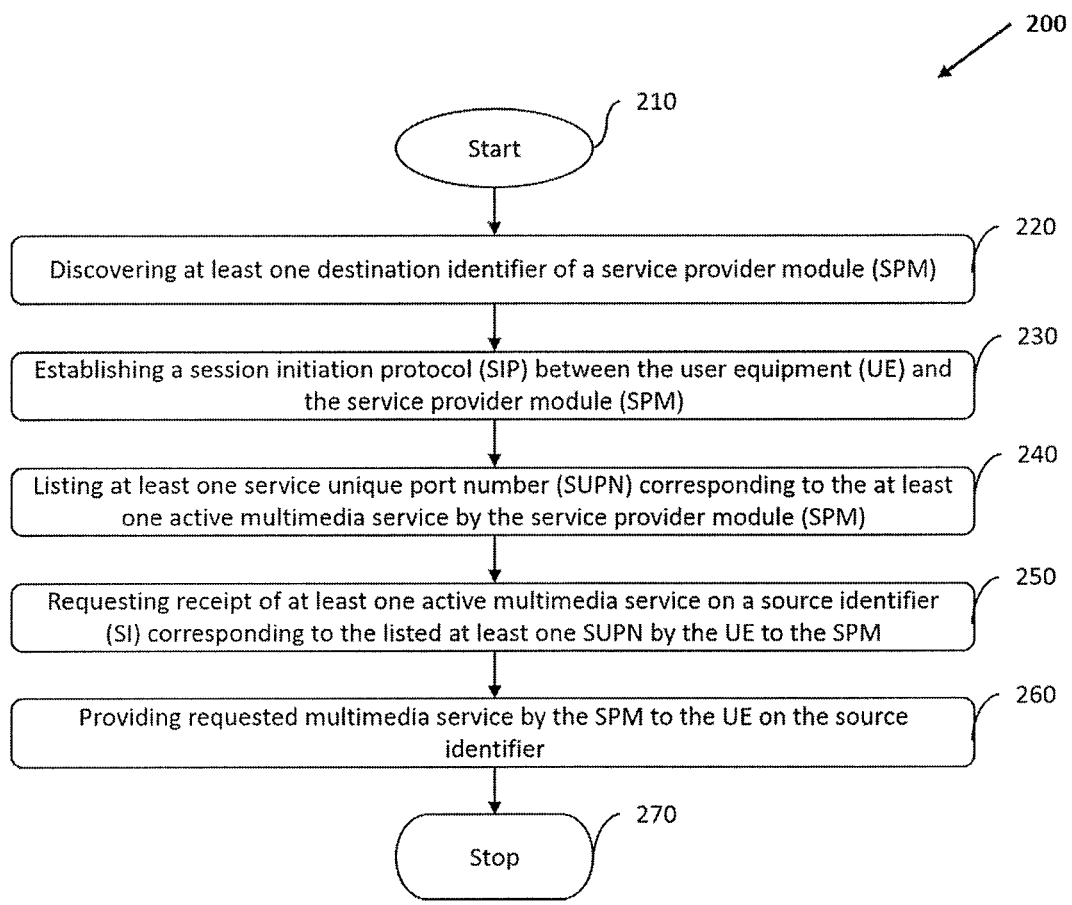
FIGURE: 2

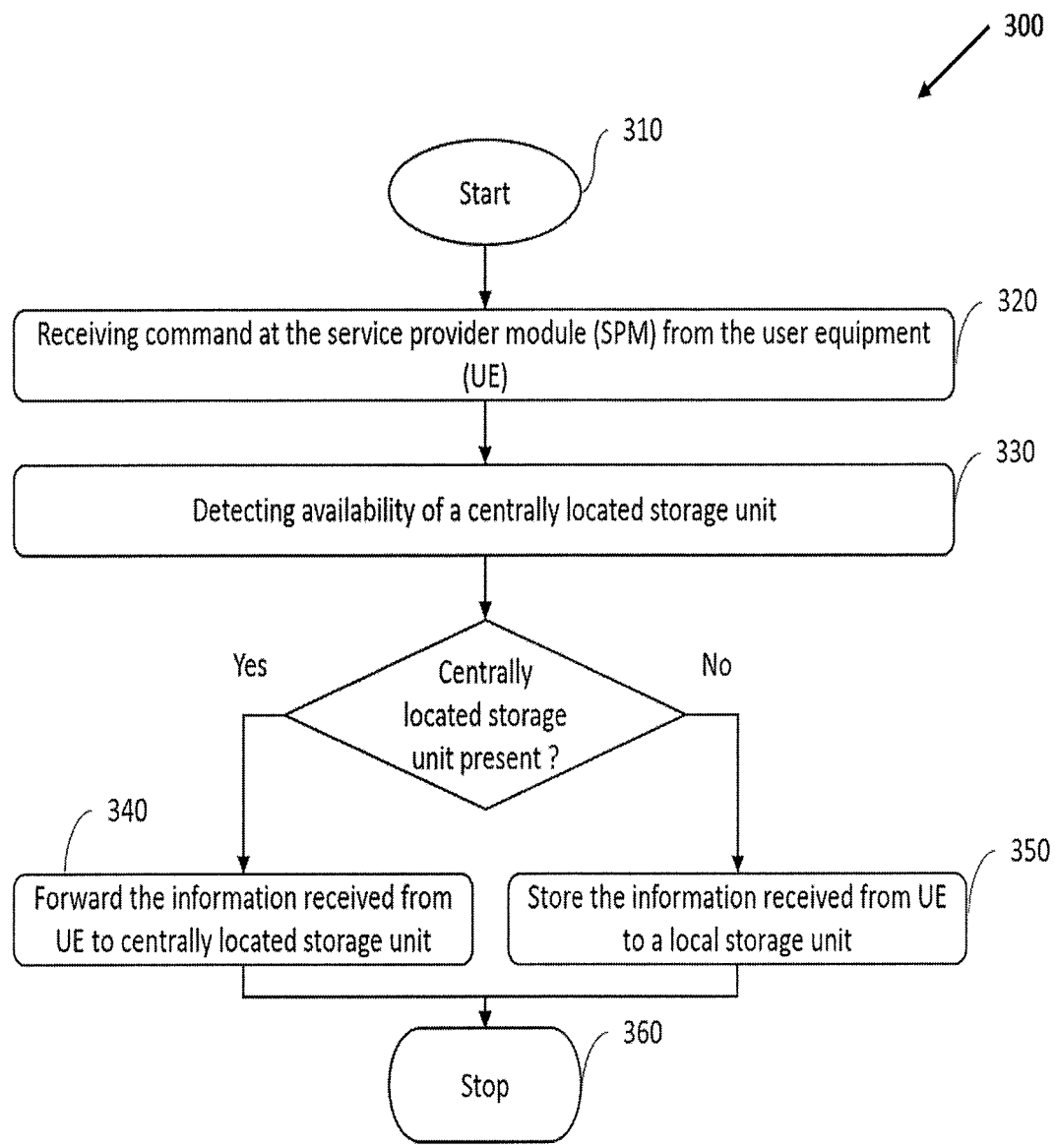
FIGURE: 3

SYSTEM AND METHOD OF PROVIDING MULTIMEDIA SERVICE TO A USER EQUIPMENT

CROSS-REFERENCE TO RELATED APPLICATIONS

This application is the U.S. national phase of PCT Application PCT/IB2015/059804 filed on Dec. 19, 2015, which claims the priority of the Indian patent application No. 4260/MUM/2014 filed on Dec. 31, 2014, which are incorporated herein by reference in their entireties.

TECHNICAL FIELD

The present disclosure generally relates to communication system. More particularly, the present disclosure relates to providing services such as Evolved Multimedia Services to legacy devices such as set-top boxes, phone and tablet devices that are incapable to receive said Evolved Multimedia Services.

BACKGROUND

In the era of evolved multimedia data transmission, the mobile users are demanding spontaneous access to video content, a higher-quality experience and more convergent mobile services than ever before. Due to the popularity and adoption of smart phones and tablets, the subscriptions for data consumption devices are expected to touch eight billions (or double figures) by 2019. The LTE Broadcast using 3GPP eMBMS technology enables operators to efficiently launch media services over LTE to meet this demand and support a wide range of new use cases. The LTE Broadcast enables multiple users to receive the same content simultaneously. The LTE broadcast can deliver the same content to multiple users with the capability to support a virtually unlimited number of users simultaneously, thereby maintaining efficient use of spectrum and network investments. The LTE eMBMS service is being deployed by multiple operators around the world providing TV services on mobile phones and tablets on the go. The LTE connectivity devices are a rich set of devices available within the LTE eco system and it is important to enable eMBMS service via such connectivity devices as well. The LTE connectivity devices like the Outdoor Consumer Premise Equipment (CPE) and My Fidelity (MiFi) routers are nothing but LTE routers providing access to end devices like the phone or a tablet via a WiFi interface. As proliferation of such LTE connectivity devices is going to high, it becomes important to support eMBMS services over such connectivity devices where in the eMBMS service is received by an LTE modem and streamed via WiFi to a connectivity device. However, to avail such eMBMS services provided by the LTE modem devices, there requires an end device which is capable of listening to eMBMS services from the LTE modems. Therefore, the legacy devices which do not support eMBMS services are not capable of receiving such eMBMS services. Also, extending eMBMS multimedia services over a connectivity routing devices to cover a host of end devices like the phones, tablets, STB exposes multiple issues. The key issues being that there is no signaling mechanism defined between a consumption end device and an LTE connectivity routing device which enables the end device to receive the multimedia service that the end devices are incapable to receive directly.

This present disclosure addresses the aforesaid problem of providing eMBMS services to the legacy devices like 2G/3G enabled devices which are not capable enough to detect and avail said eMBMS services.

The present disclosure proposes a solution to the aforesaid problem by providing mechanisms to extend the eMBMS service via LTE connectivity devices or LTE modems to end devices connected to connectivity devices. Extending eMBMS services over connectivity devices to cover a host of end devices like the phones, tablets, STB etc. exposes multiple issues. For example the set-top boxes or any connectivity device must interact with an LTE modem device providing eMBMS access, typically over Ethernet or WiFi. The LTE integrated devices i.e. phones, tablets typically incorporate the modem, middleware and application in the same device. As the consumption devices or end devices like set-top boxes and legacy phone and tablet devices cannot receive LTE eMBMS channels directly. Therefore, they need to interact with devices that provide 4G eMBMS modem functionality. In such architectures, the end consumption device runs the application and middleware (legacy 2G/3G phones are assumed to be capable of downloading and running the Middleware/Dash player application also called as a Broadcast application).

SUMMARY

The present disclosure provides a solution to provide eMBMS multimedia service solution to legacy devices like 2G/3G phones which cannot access the services directly in the present conditions.

The present disclosure also provides LTE multimedia broadcast using 3GPP eMBMS technology to enable operators to efficiently launch media services over LTE which helps meet this media services demand from legacy device users.

The present disclosure further provides an efficient distribution of live and similar digital multimedia services.

The present disclosure provides extended multiple users with the capability to support a virtually unlimited number of users simultaneously, thereby maintaining efficient use of spectrum and network investments.

The system for providing at least one multimedia service to a user equipment as disclosed in the present disclosure includes a service provider module (SPM) for receiving multimedia service from a network entity, a user equipment (UE) for availing the multimedia service, wherein the user equipment is incompatible of receiving the multimedia service directly from the network entity. The user equipment (UE) further comprises at least one source identifier (SI) including at least one receiver unique port number (RUPN) for receiving multimedia service; and the service provider module (SPM) has at least one destination identifier (DI) including at least one service unique port number (SUPN) corresponding to at least one multimedia service; Further, a session initiation protocol (SIP) is established between the user equipment and the service provider module (SPM) by binding said at least one destination identifier (DI) with said at least one source identifier (SI) for providing said requested multimedia service to the user equipment (UE).

The method of providing at least one multimedia service to a user equipment, wherein the user equipment (UE) is incompatible to receive said multimedia service, the method comprising steps of discovering by the user equipment (UE), at least one destination identifier (DI) of a service provider module (SPM); establishing a session initiation protocol (SIP) between the user equipment (UE) and the service provider module (SPM) by binding said at least one destination identifier (DI) with said at least one source identifier (SI); listing by the service provider module (SPM) to the user equipment (UE), the at least one service unique port number (SUPN) corresponding to the at least one active multimedia service; requesting by the user equipment (UE), receipt of at least one active multimedia service corresponding to the listed at least one service unique port number (SUPN) on (or at) the at least one source identifier (SI) of the user equipment (UE); and providing said requested multimedia service by the service provider module (SPM) to the user equipment (UE) on the at least one source identifier (SI). The user equipment has at least one source identifier (SI) including at least one receiver unique port number (RUPN) for receiving said multimedia service; and the service provider module (SPM) has the at least one destination identifier (DI) including at least one service unique port number (SUPN) corresponding to said at least one multimedia service.

BRIEF DESCRIPTION OF THE DRAWINGS

FIG. 1a illustrates a system for providing multimedia service to a user equipment.

FIG. 1b illustrates an exemplary system diagram of the present disclosure.

FIG. 1c illustrates an exemplary communication flow diagram of the interaction between various modules of the present system.

FIG. 2 illustrates a method providing multimedia service to a user equipment.

FIG. 3 illustrates a method storing user data and multimedia session data in a storage unit.

DETAILED DESCRIPTION OF EXEMPLARY EMBODIMENTS

In the following description, for the purposes of explanation, various specific details are set forth in order to provide a thorough understanding of the present disclosure. It will be apparent, however, that the present disclosure may be practiced without these specific details. Several features described hereafter can each be used independently of one another or with any combination of other features. However, any individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

The present disclosure discloses a system and method of providing multimedia service to an end device herein after referred to as a user equipment, wherein the user equipment (UE) is incompatible to receive the multimedia service. The system comprises a user equipment to which the eMBMS services is to be delivered via a service provider module, wherein, the service provider module is capable of detecting and forwarding the multimedia services to the user equipment. The system further comprising a storage unit for storing data identifying every unique user equipment, wherein the storage unit is situated either locally at the service provider module or centrally at the network level.

Further, the present disclosure discloses a method of providing multimedia service to a user equipment, wherein the user equipment (UE) is not capable of receiving said multimedia service. The method comprising steps of discovering a service provider module which is capable of providing multimedia service by the user equipment (UE), wherein the user equipment (UE) is not capable of detecting and receiving the multimedia service of its own. The user equipment discovers at least one destination identifier including at least one service unique port number (SUPN) of the service provider module, wherein the service unique port number (SUPN) corresponds to different multimedia service. Once the destination identifier of the service provider module is identified by the user equipment, a session initiation protocol is established between the user equipment and the service provider module. As soon as the session initiation protocol is established between then service provider module and the user equipment, the service provider module lists a set of ongoing services received from the network provider, wherein the list includes the service unique port number (SUPN) which corresponds to different multimedia services. The user equipment opts the desired multimedia service by sending a request to the service provider module with service unique port number (SUPN) of the service provider module which corresponds to a different multimedia service and a source identifier which is nothing but the address of the user equipment to which the multimedia service is to be provided.

As illustrated in FIG. 1a, the system 100 comprises a user equipment (UE) 140, a service provider module (SPM) 130 for providing multimedia service to the user equipment (UE) 140 and a network entity 120 from which the service provider module (SPM) 130 fetch multimedia service for providing the same to the user equipment (UE) 140. The network entity 1320 further comprises a central storage unit 140 for storing user equipment related information for identifying every single user equipment (UE).

The service provider module (SPM) 130 as used herein is a LTE router device but not limited to LTE modem device, outdoor CPU or MiFi device which is capable of receiving LTE or similar services and route them to end device.

The user equipment (UE) 140 as used herein is a device which is not capable of detecting and receiving multimedia services directly such as legacy mobile phones and any personal digital assistance devices (PDA) enabled with 2G/3G or any lower generation. The multimedia serviced as used herein include but not limited to evolved unicast and broadcast services such as eMBMS services. Further, the user equipment (UE) 140 is configured with a display unit 112 for displaying the multimedia service received from the service provider module, wherein the display unit 112 is selected from a wide range of display elements such as LCD and LED.

The service provider module (SPM) 130 and the user equipment (UE) 140 has a processing unit (114, 132) each for performing various activities. The processing unit (114, 132) of the service provider module (SPM) 130 is configured to perform various data processing tasks such as but not limited to processing the multimedia service received from the network entity, segregating different services in the different port present in the service provider module, copulating the multimedia service and providing the same to the user equipment. The processing unit used in the user equipment is configured to but not limited to search and process the information about the service provider module, receiving data and decapsulating multimedia service. The processing unit used in the present system is opt from various multi-purpose microcontroller or similar processors.

Further, the service provider module and the user equipment (UE) 140 have a destination identifier and a source identifier respectively. The source identifier and destination identifier includes but not limited to respective IP address, port information and a unique identity information. The destination identifier of the service provider module includes at least one unique port herein after referred to as service unique port number (SUPN1, SUPN2, SUPN3, SUPNn), wherein the service unique port number (SUPN) corresponding to said at least one multimedia service. The source identifier of the user equipment includes at least one unique port herein after referred to as receiver unique port number (RUPN), wherein the source identifier including receiver unique port number (RUPN) is used to identify destination user equipment providing desired multimedia service.

The storage unit used herein is from a variety of data storages such as non-volatile media and/or volatile media and in the present system the storage unit is either situated at the device level (locally) 134 i.e. at the service provider module or at the network level (centrally) 110 i.e. at the network entity. The storage unit stores information that includes but not limited to the IP address of the end device, port information, TMGI and the multicast IP address of the multimedia service. The information can be retrieved in a real time or periodical manner from the storage unit to identify the requested multimedia service and the requesting user terminal.

Further, the non-volatile media may include, for e.g., optical disks, magnetic disks, or solid-state drives, such as storage device volatile media may include dynamic memory, such as main memory common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The present system 100 encompasses extending the coverage of LTE eMBMS broadcast data referred to as multimedia service by forwarding the eMBMS data on a non-LTE medium. An example of the medium can be WiFi or AT interface wherein end consumption devices i.e. the user equipment receives the eMBMS data from the LTE device referred to as the service provider module over WiFi channel. The user equipment detects the service provider module which can provide the multimedia service and establishes a connection using a session initiation protocol such as transmission control protocol (TCP) and user datagram protocol (UDP). The service provider module encapsulates the eMBMS data coming over the LTE medium with extra headers and sends it across the non LTE medium. The user equipment removes the extra header information and processes the eMBMS data for availing the provided multimedia service.

Further, in a preferred embodiment, the present disclosure encompasses the schema of the eMBMS command used to invoke an eMBMS session which is the multimedia service session from an end device application to the Modem in the LTE connectivity device is shown below:

| AT%MBMSCMD | |
|---|---|
| Command | Possible responses |
| %MBMSCMD=<cmd>[,<param1>[,<param2>]] | OK/ERROR/%MBMSCMD:<ResponseType> |
| %MBMSCMD? | Return list of available services: |
| %MBMSCMD: | %MBMSCMD: <TMGI>[[,<SessionID>]] |
| %MBMSCMD: | %MBMSCMD: <TMGI>[,<SessionID>] |
| | ... |
| %MBMSCMD: | %MBMSCMD: <TMGI>[,<SessionID>] |
| | OK/ERROR |
| %MBMSCMD=? | %MBMSCMD: List of supported <cmd> |

Description

AT command to manage MBMS reception.

Defined Values

ACTIVATE/DEACTIVATE a particular session

Description

This command is used to activate or deactivate a particular session. The MW will send this command with all the relevant parameters. Any intermediate optional parameter (<param1> and <param2>) has to be kept blank if no value is assigned or if the parameter is not supported.

Defined Values

| | |
|---|---|
| <cmd> | ➢ "ACTIVATE" - Activate specific <TMGI>on specific <Session ID><br>➢ "DEACTIVATE" - Deactivate specific <TMGI>on specific <Session ID> |
| <param1>: | ➢ TMGI (See details in <TMGI>description below) |
| <param2>: | ➢ Session ID (See details in <Session ID>description below) |
| <param3>: | ➢ Multicast IP address (See details in <Multicast IP address>description below) |

FIG. 1b illustrates an exemplary embodiment of the present system for providing eMBMS service to an incompatible a user equipment (UE) 140 by a LTE enabled modem unit 130. The user equipment comprises an application layer for providing and availing eMBMS service; a middleware entity for detecting and converting the eMBMS service in a playable version by the application layer; and a modem for receiving the forwarded list of eMBMS services from the modem unit 130.

FIG. 1c illustrates an exemplary communication flow diagram 150 of the communication between the various modules of user equipment (UE) and modem unit of an outdoor CPU unit (ODU). The middleware (MW) of the user equipment requests to the ODU for providing list of active eMBMS service through an intermediate router (HGW). In return of the request sent by the middleware (MW) in form of command, the ODU sends a list of active eMBMS service along with port details for channel creation for eMBMS session. Further, the middleware (MW) requests the ODU with various details of service preference and other details such as a start a service, stop a service, service preference, a list of active service, a preferred list of frequencies, a service area ID and list of current and available service area ID's, Temporary mobile group ID, Cell ID, Device information like MAC ID, Signal strength, Middleware ID, Network Information like Time in UTC and combination thereof. In return, the ODU encapsulates the requested eMBMS session and transmits to the MW of the user equipment (UE). At the user equipment (UE) 140 terminal, the data of the eMBMS session is encapsulated and played through the application layer.

FIG. 2 illustrates the method of providing multimedia service to a user equipment, wherein the user equipment (UE) is incompatible of receiving said multimedia service. The method 200 initiates at step 210.

At step 220, the user equipment (UE) discovers a destination identifier (DI) of a service provider module (SPM), wherein the destination identifier (DI) includes one service unique port number (SUPN) corresponding to one multimedia service. Further, the user equipment (UE) has a source identifier (SI) including at least one receiver unique port number (RUPN). The user equipment (UE) discovers the destination identifier (DI) of the service provider module (SPM) using a query such as DNS query.

At step 230, a session initiation protocol (SIP) is established between the user equipment (UE) and the service provider module (SPM). The session initiation protocol (SIP) is established by binding the destination identifier (DI) with said at least one source identifier (SI).

At step 240, the service provider module (SPM) lists the at least one service unique port number (SUPN) corresponding to the at least one active multimedia service to the user equipment (UE).

At step 250, the user equipment (UE) requests the receipt of at least one active multimedia service corresponding to the listed at least one service unique port number (SUPN) at the source identifier (SI) of the user equipment (UE). The request to receive at least one active multimedia service is made using command such as AT command. Further, the AT command is used to activate TMGI for initiating a session. Once the TMGI is activated, a user datagram protocol (UDP) packets are transmitted containing the multicast IP address of that particular TMGI.

At step 260, the service provider module (SPM) provides requested multimedia service to the user equipment (UE) on the source identifier (SI) provided at step 250. The method 200 terminates at step 270.

Further, the method encompasses a series of commands which will be sent from the user equipment (UE) to service provider module (SPM), wherein the commands include but not limited to start a service, stop a service, service preference, a list of active service, a preferred list of frequencies, a service area ID and list of current and available service area ID's, Temporary mobile group ID, Cell ID, Device information like MAC ID, Signal strength, Middleware ID, Network and Information like Time in UTC. The command is preferably a AT type command sent from the user equipment (UE) to service provider module (SPM) via one of wireless, wired and combination thereof. The objectives of the commands include but not limited to initiate a multimedia (eMBMS) service on the service provider module (SPM), requesting for the number of active multimedia services, stopping a multimedia service, sending the preferred list of frequencies and service area IDs supporting a particular multimedia service. Furthermore, the service provider module (SPM) can provide multimedia service to multiple user equipment simultaneously. Further, the AT command is used to indicate a preference of user equipment (UE) for receiving a service such as unicast service being preferred over a multicast service or vice versa.

The present disclosure encompasses encapsulating the multimedia service data received by the service provider module (SPM) from the network entity in UDP/IP and is transmitted to the user equipment (UE) wherein the extra encapsulation is removed for end user consumption.

Further, the service provider module (SPM) encapsulate the multimedia data in an external UDP (eUDP) with a specified port number such as 7788. The unicast IP will have service provider module (SPM) address as source address and user equipment's (UE) public address as destination address if it is behind a router or private address if it is directly connected to service provider module. In this scenario, the port number is 7788 if the device is directly connected to service provider module (SPM) else it will be a public port number. The user equipment (UE) always listen on the specified port number and as an example it can be 7788. The intermediate router will convert the public port to 7788 if the device is behind the router. The service provider module (SPM) listens on port 7799 for the first UDP packet from the user equipment (UE) to know the public address (and port) of the user equipment (UE).

FIG. 3 illustrates the method of storing data communicated by the user equipment (UE) to the service provider module (SPM). The method 300 initiates at step 310.

At step 320, the service provider module (SPM) receives command form the user equipment (UE), wherein the command includes but not limited to information pertaining to the port details of the service provider module (SPM) that corresponds to a different multimedia service and information pertaining to the source identifier of the user equipment (UE) for providing the multimedia service.

At step 330, the service provider module (SPM) detects the availability of a network assisted storage (NAS) which is nothing but a centrally located storage unit for storing the data sent by the user equipment (UE).

At step 340, the service provider module (SPM) forwards the data sent by the user equipment (UE) for storing the data for future retrieval, if the centrally located storage unit is detected.

At step 350, the service provider module (SPM) stores the data sent by the user equipment (UE) at a local storage unit, if the centrally located storage unit is not detected. The method 300 terminates at step 360.

Further, the data stored at one of the local storage unit and central unit can be retrieved in real time or periodically by the service provider module (SPM) for providing a dynamic multimedia service. The multimedia service is provided dynamically by storing the request pattern of user or similar factor for receiving a particular multimedia service.

Furthermore, a local caching function is implemented in the service provider module and in the user equipment (UE) for downloading an electronic program guide (EPG) for knolling a list of sessions that it is subscribed by the user equipment (UE) and indicating the services that the user equipment (UE) wants the service provider module (SPM) to store for later viewing, wherein the service provider module (SPM) is capable of receiving an Electronic Program Guide (EPG) data. The service provider module (SPM) has a video recommendation engine which collects and refines the user interest patterns and based on the inputs from the video recommendation engine autonomously store eMBMS multimedia service streams that is possible interest to the end user or end user groups.

The method further encompasses defining a database at the service provider module (SPM) which includes but not limited to an identifier to identify each end devices (user equipment) connected to the service provider module (SPM), the IP address of the user equipment (UE), port information, TMGI and the multicast IP address of the multimedia service. The service provider module (SPM) uses one or a combination of the said parameters to distinguish between devices and services requested by each of the user equipment (UE) that is connected to it.

For providing multimedia service, there needs to be a tunnel established between the user equipment (UE) and the service provider module (SPM) and in order to facilitate the establishment of such a tunnel in the present disclosure, the user equipment needs to send more than one dummy packet for a user datagram protocol (UDP) based connection and single packet for a transmission control protocol (TCP) based connection. Further, the service provider module (SPM) needs to use the information in the UDP dummy packet to establish a tunnel between the service provider module (SPM) and the user equipment (UE). The present disclosure further encompasses the dummy UDP packets to be sent to the service provider module (SPM) by the user equipment (UE) immediately after discovering the service provider module (SPM) in a local network scenario such as wireless fidelity channel and after sending the eMBMS command requesting for a multimedia service or multimedia session. Also, the UDP dummy packets can be sent immediately after discovering the service provider module (SPM).

The present disclosure further encompasses providing multiple multimedia service request from a same or different user equipment. The consumption end can reside in separate user equipment (UE) or in the same user equipment (UE). If both instances reside in the same user equipment (UE) then the IP address of first end consumption device and second consumption end device will be same. It is the responsibility of service provider module to convert the AT commands received in parallel from the two end consumption devices instances and feed the multimedia service serially. Thus, the service provider module (SPM) holds the second AT command till it receives the response regarding availability of multimedia service internally for the first AT command.

In a scenario, it is possible that the user equipment is receiving a multimedia service directly from an LTE network. When the user equipment (UE) goes out of coverage from the direct LTE network, user equipment (UE) will scan for possible availability of any service provider module (SPM) availability. When such a service provider module (SPM) is available, the user equipment (UE) establishes a connection with the service provider module (SPM) and establish an eMBMS multimedia session reception tunnel.

Further, the present disclosure encompasses the end device scanning for possible available service provider module (SPM) when the multimedia Bit error rate or frame error rate goes above a predefined threshold. When such a service provider module (SPM) is available even when a direct multimedia service signal is still available; the user equipment (UE) decides one which connectivity to choose based on the buffering events seen in each link.

In case of a WiFi link i.e. when the user equipment (UE) is receiving an eMBMS multimedia session on a WiFi link and the WiFi link is lost; the user equipment (UE) waits for a period of time to see if the link can be revived. The amount of time that the user equipment (UE) waits for a possible link revival in one embodiment can be dynamic and based on the factors of history of link failures in that location, a prior knowledge of link stability and the available bit error or frame error rates.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

We claim:

1. A method of providing at least one evolved multimedia service to at least one user equipment (UE), the method comprising steps of:
    discovering by the at least one user equipment (UE), at least one destination identifier (DI) of a service provider module (SPM), wherein
    the at least one user equipment is a non-long-term evolution (non-LTE) device and the service provider module (SPM) is an long-term evolution (LTE) connectivity device that receives said evolved multimedia service from a network entity,
    the user equipment has at least one source identifier (SI) including at least one receiver unique port number (RUPN) for receiving said evolved multimedia service;
    the service provider module (SPM) has the at least one destination identifier (DI) including at least one service unique port number (SUPN) corresponding to said at least one evolved multimedia service, and
    establishing a connection, using a session initiation protocol (SIP), between the at least one user equipment (UE) and the service provider module (SPM) by binding said at least one destination identifier (DI) with said at least one source identifier (SI);
    listing by the service provider module (SPM) to the at least one user equipment (UE), the at least one service unique port number (SUPN) corresponding to the at least one active evolved multimedia service;
    requesting by the at least one user equipment (UE) using an Attention (AT) command, receipt of at least one active evolved multimedia service corresponding to the listed at least one service unique port number (SUPN) on the at least one source identifier (SI) of the user equipment (UE); and
    providing said requested active evolved multimedia service by the service provider module (SPM) to the at least one user equipment (UE) on the at least one source identifier (SI).

2. The method as claimed in claim 1, further comprises sending at least one command to the service provider module (SPM) by the at least one user equipment (UE).

3. The method as claimed in claim 2, wherein said command comprises one of a start a service, stop a service, service preference, a list of active service, a preferred list of frequencies, a service area ID and list of current and available service area ID's, Temporary mobile group ID, Cell ID, Device information like MAC ID, Signal strength, Middleware ID, Network Information like Time in UTC and combination thereof.

4. The method as claimed in claim 1, wherein the at least one source identifier (SI) comprises one of IP address of the user equipment, the RUPN, temporary mobile group identity (TMGI), multimedia IP address, and combination thereof.

5. The method as claimed in claim 1, wherein the at least one source identifier (SI) is stored one of locally and centrally, for identifying the at least one user equipment (UE) by the service provider module (SPM) for providing the requested at least one active evolved multimedia service.

6. The method as claimed in claim 1, further comprising sending at least one dummy packet from the at least one user equipment (UE) to the service provider module (SPM) based on the session initiation protocol (SIP).

7. The method as claimed in claim 1, further comprising of setting a service preference to a modem via the AT commands to indicate if the unicast or multicast has more preference than one another.

8. The method as claimed in claim 1, wherein the session initiation protocol (SIP) is one of a user datagram protocol (UDP), a transmission control protocol (TCP), and combination thereof.

9. The method as claimed in claim 1, further comprising encapsulating a data associated with the evolved multimedia service by the service provider module (SPM) for providing the evolved multimedia service to the at least one user equipment (UE).

10. The method as claimed in claim 1, further comprising decapsulating the data associated with the multimedia service by the at least one user equipment (UE) for availing said evolved multimedia service.

11. A system for providing at least one evolved multimedia service to aat least one user equipment, the system comprises:
the at least one user equipment (UE) is a non-long-term evolution (non-LTE) device that comprises at least one source identifier (SI) including at least one receiver unique port number (RUPN) for receiving evolved multimedia service; and
a service provider module (SPM) for providing at least one evolved multimedia service to the at least one user equipment (UE), wherein
the service provider module (SPM) is a long-term evolution (LTE) connectivity device that receives said at least one evolved multimedia service from a network entity,
the service provider module (SPM) has at least one destination identifier (DI) including at least one service unique port number (SUPN) corresponding to at least one evolved multimedia service;
wherein a connection, using a session initiation protocol (SIP), is established between the at least one user equipment (UE) and the service provider module (SPM) by binding said at least one destination identifier (DI) with said at least one source identifier (SI) of the at least one user equipment (UE) for providing said requested evolved multimedia service to the at least one user equipment (UE);
wherein the service provider module (SPM) lists to the at least one user equipment (UE), the at least one service unique port number (SUPN) corresponding to the at least one active evolved multimedia service;
wherein the at least one user equipment (UE) requests, using an Attention (AT) command, receipt of at least one active evolved multimedia service corresponding to the listed at least one service unique port number (SUPN) on the at least one source identifier (SI) of the user equipment (UE); and
wherein said requested active evolved multimedia service is provided by the service provider module (SPM) to the at least one user equipment (UE) on the at least one source identifier (SI).

12. The system as claimed in claim 11, further comprises at least one storage unit for storing a data corresponding to the at least one source identifier (SI) one of locally and centrally.

13. The system as claimed in claim 11, wherein the at least one user equipment (UE) and the service provider module (SPM) are connected over one of a wireless fidelity channel and a wired channel.

14. The method as claimed in claim 1, wherein the AT command activates a temporary mobile group identity (TMGI) for initiating a session.

15. The method as claimed in claim 14, wherein said requested active evolved multimedia service is provided by the service provider module (SPM) to the at least one user equipment (UE) on the at least one source identifier (SI) based on activation of the TMGI.

* * * * *